United States Patent
Varrassi et al.

(10) Patent No.: US 11,946,594 B2
(45) Date of Patent: Apr. 2, 2024

(54) MOBILE CRYOGENIC TANK AND PROVISIONING METHOD

(71) Applicant: L'Air Liquide, Societe Anonyme pour l'Etude et l'Exploitation des Procedes Georges Claude, Paris (FR)

(72) Inventors: Lucien Varrassi, Argancy (FR); Philippe Cadeau, Sassenage (FR); Thomas Fayer, Sassenage (FR); Stephane Duval, Sassenage (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 17/794,208

(22) PCT Filed: Jan. 14, 2021

(86) PCT No.: PCT/EP2021/050644
§ 371 (c)(1),
(2) Date: Jul. 20, 2022

(87) PCT Pub. No.: WO2021/148297
PCT Pub. Date: Jul. 29, 2021

(65) Prior Publication Data
US 2023/0055875 A1 Feb. 23, 2023

(30) Foreign Application Priority Data
Jan. 24, 2020 (FR) .................................. 2000685

(51) Int. Cl.
*F17C 13/02* (2006.01)
*F17C 3/04* (2006.01)
*F17C 9/00* (2006.01)

(52) U.S. Cl.
CPC .............. *F17C 13/026* (2013.01); *F17C 3/04* (2013.01); *F17C 9/00* (2013.01);
(Continued)

(58) Field of Classification Search
CPC .............. F17C 13/026; F17C 3/04; F17C 9/00
See application file for complete search history.

(56) References Cited

U.S. PATENT DOCUMENTS

| | | | |
|---|---|---|---|
| 2013/0327421 A1 | 12/2013 | Chang et al. | |
| 2014/0290791 A1* | 10/2014 | Isom | B65B 3/12 |
| | | | 141/4 |
| 2018/0135994 A1* | 5/2018 | Stahl | F17C 13/026 |

FOREIGN PATENT DOCUMENTS

| | | |
|---|---|---|
| DE | 10 2008 019594 | 10/2009 |
| DE | 102016203336 A1 * | 9/2017 |

(Continued)

OTHER PUBLICATIONS

DE-102016203336-A1—English Translation (Year: 2017).*
(Continued)

*Primary Examiner* — Timothy P. Kelly
*Assistant Examiner* — Christopher M Afful
(74) *Attorney, Agent, or Firm* — Justin K. Murray

(57) ABSTRACT

Mobile cryogenic tank for transporting cryogenic fluid, notably liquefied hydrogen or helium, comprising an internal shell intended to contain the cryogenic fluid, an external shell arranged around the internal shell and delimiting a space between the two shells, said space containing a thermal insulator, the first shell having a cylindrical overall shape extending along a central longitudinal axis (A), when the tank is in the configuration for transport and use, the central longitudinal axis (A) being oriented horizontally, the tank comprising a set of temperature sensors measuring the temperature of the fluid in the internal shell, characterized in (Continued)

that the set of temperature sensors is situated on the external face of the internal shell and measure the temperature of said shell, the set of temperature sensors comprising a lower sensor positioned at the lower end of the internal shell situated below the central longitudinal axis (A), the set of temperature sensors further comprising a plurality of intermediate sensors distributed over two lateral faces of the internal shell on each side of the central longitudinal axis (A), the plurality of intermediate sensors being distributed vertically between the lower end of the internal shell situated below the central longitudinal axis (A) and the upper end of the internal shell situated above the central longitudinal axis (A).

14 Claims, 2 Drawing Sheets

(52) U.S. Cl.
CPC ...... *F17C 2201/0109* (2013.01); *F17C 2201/035* (2013.01); *F17C 2203/011* (2013.01); *F17C 2203/0304* (2013.01); *F17C 2203/0391* (2013.01); *F17C 2203/0629* (2013.01); *F17C 2203/0643* (2013.01); *F17C 2203/0646* (2013.01); *F17C 2205/0161* (2013.01); *F17C 2205/0323* (2013.01); *F17C 2205/0352* (2013.01); *F17C 2221/012* (2013.01); *F17C 2221/017* (2013.01); *F17C 2223/0161* (2013.01); *F17C 2223/033* (2013.01); *F17C 2227/0107* (2013.01); *F17C 2227/0135* (2013.01); *F17C 2250/032* (2013.01); *F17C 2250/034* (2013.01); *F17C 2250/0408* (2013.01); *F17C 2250/0426* (2013.01); *F17C 2250/043* (2013.01); *F17C 2250/0439* (2013.01); *F17C 2250/0491* (2013.01); *F17C 2250/0626* (2013.01); *F17C 2250/0694* (2013.01); *F17C 2260/02* (2013.01); *F17C 2265/063* (2013.01); *F17C 2270/0171* (2013.01)

(56) References Cited

FOREIGN PATENT DOCUMENTS

KR      2013 0058968      6/2013
WO      WO-2004110144 A2 * 12/2004 ............... A01N 1/02

OTHER PUBLICATIONS

WO-2004110144-A2—English Translation (Year: 2004).*
International Search Report and Written Report for PCT/EP2021/050644, dated Apr. 23, 2021.
French Search Report and Written Opinion for FR 2 000 685, dated Sep. 29, 2020.

* cited by examiner

[Fig. 1]
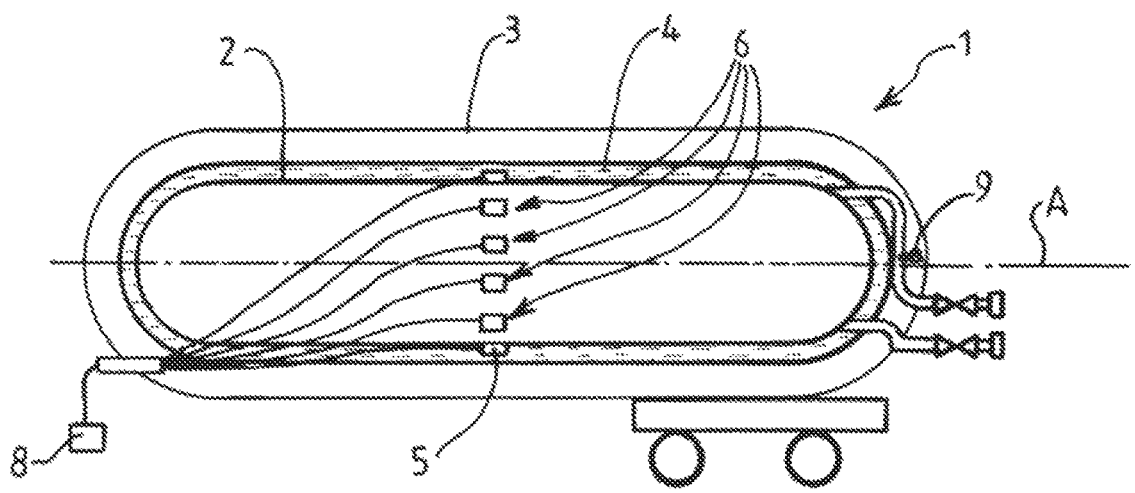
[Fig. 2]
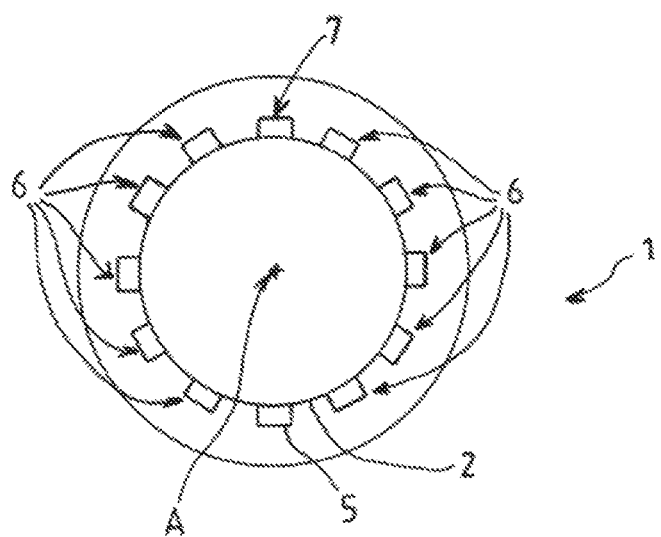

[Fig. 3]
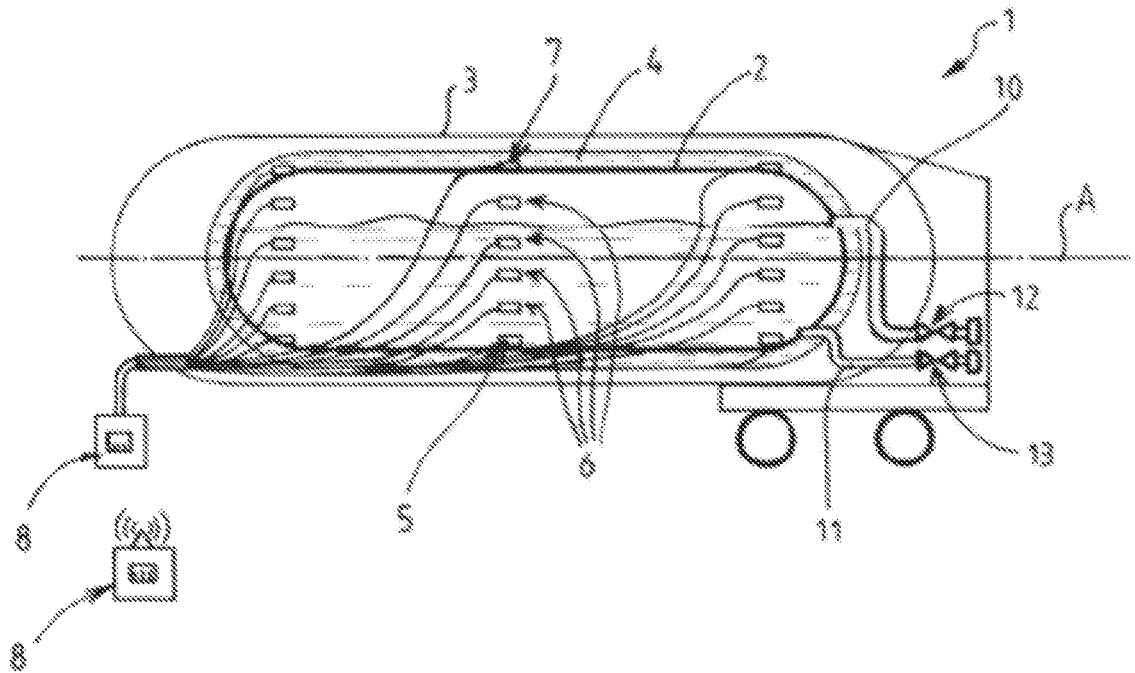
[Fig. 4]
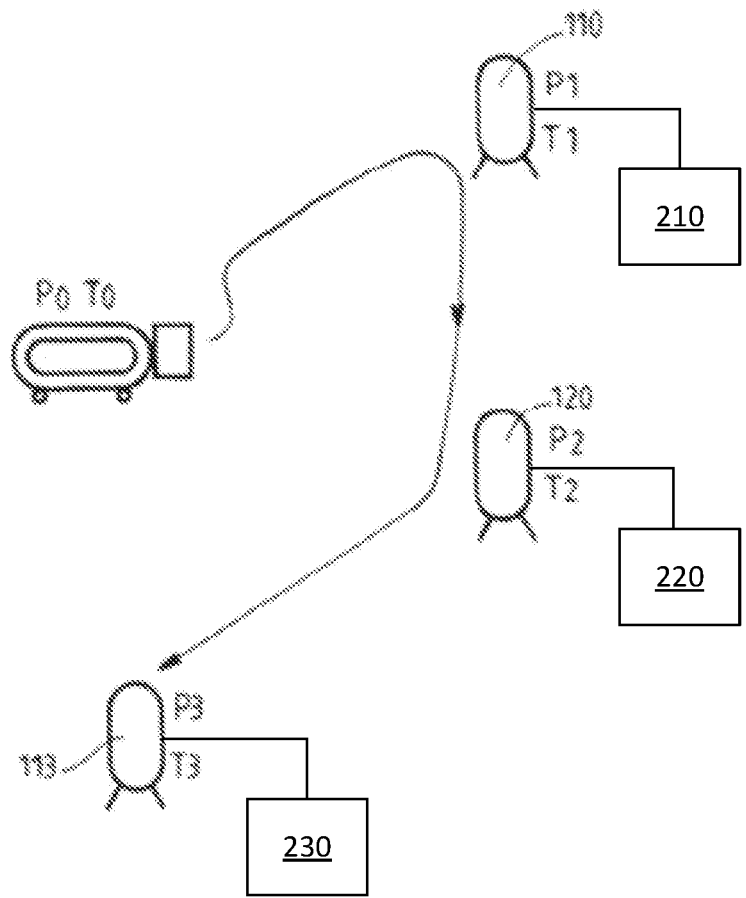

MOBILE CRYOGENIC TANK AND PROVISIONING METHOD

CROSS-REFERENCE TO RELATED APPLICATIONS

This application is a § 371 of International PCT Application PCT/EP2021/050644, filed Jan. 14, 2021, which claims § 119(a) foreign priority to French patent application FR 2000685, filed Jan. 24, 2020.

BACKGROUND

Field of the Invention

The invention relates to a cryogenic tank and to a provisioning method using such a tank.

The invention relates more particularly to a mobile cryogenic tank for transporting cryogenic fluids, particularly liquefied hydrogen or helium, comprising an inner shell intended to contain the cryogenic fluid, an outer shell positioned around the inner shell and delimiting a space between the two shells, said space containing a thermal insulant, the first shell having a cylindrical overall shape extending along a central longitudinal axis, when the tank is in the transport and usage configuration, the central longitudinal axis being oriented horizontally, the tank comprising a set of temperature sensors measuring the temperature of the fluid in the inner shell.

The invention relates in particular to the semitrailers or ISO containers for transporting cryogenic fluids which transport liquefied gas (with a fairly sizeable gas phase in the upper part which may occupy for example from 10% to over 90% of the volume of the inner shell).

The fluid transported may for example be helium, hydrogen, natural gas or any other gas or mixture.

Related Art

Such a mobile tank is designed to provision with liquid stations (to fill fixed stores for example) that have diverse characteristics.

It is difficult to know the level of liquid and the thermodynamic conditions of the fluid (liquid) transported. Yet this knowledge is of great importance for allowing effective delivery to a plurality of stations.

SUMMARY OF THE INVENTION

An aim of the present invention is to overcome all or some of the drawbacks of the prior art that are set out above.

To that end, the tank according to the invention, which incidentally conforms to the generic definition thereof even in the above preamble, is essentially characterized in that the set of temperature sensors is situated on the outer face of the inner shell and measures the temperature of said shell, the set of temperature sensors comprising a lower sensor positioned at the lower end of the inner shell situated below the central longitudinal axis, the set of temperature sensors further comprising a plurality of intermediate sensors distributed over two lateral faces of the inner shell on either side of the central longitudinal axis, the plurality of intermediate sensors being distributed vertically between the lower end of the inner shell situated below the central longitudinal axis and the upper end of the inner shell situated above the central longitudinal axis.

Moreover, embodiments of the invention may have one or more of the following features:

the set of temperature sensors is situated in the central part of the tank between the two longitudinal ends, the plurality of intermediate sensors comprises two sets of three to ten sensors each, the two sets of sensors being situated respectively on two opposite lateral faces of the inner shell, on either side of the central longitudinal axis, sensors being spaced apart from one another vertically between the lower end and the upper end of the inner shell, the two sets of intermediate sensors each comprise four, five, six, seven or eight sensors, the set of temperature sensors comprises an upper sensor positioned at the upper end of the inner shell situated above the central longitudinal axis, the set of temperature sensors comprises several groups of sensors situated at two distinct longitudinal locations along the longitudinal direction, each of the two groups of temperature sensors comprising a plurality of intermediate sensors distributed over two lateral faces of the inner shell on either side of the central longitudinal axis and distributed vertically between the lower end of the shell situated below the central longitudinal axis and the upper end of the shell situated above the central longitudinal axis, the tank comprises an electronic data storage and processing member comprising a microprocessor and/or a computer, said electronic member being connected to the set of temperature sensors and being configured to receive the temperature values measured by said sensors and determine at least one of the following: the temperature of the fluid in the tank, the level of liquid in the tank, the volume of liquid in the tank, the tank comprises a pressure sensor for measuring the pressure in the inner shell, the tank comprises a set of pipe(s) equipped with valve(s) connected to the inner shell and opening to outside the tank for filling and withdrawing from the inner shell, the tank comprises at least one intermediate sensor situated at a vertical position of the inner shell corresponding to a maximum fill level for filling the tank with liquid and notably to the level at which the filling of said tank is stopped, this corresponding for example to between 90 and 98%, and notably to 94% of the water-holding volume of the inner shell.

The invention also relates to a method for provisioning a plurality of cryogenic fluid storage and usage stations with cryogenic fluid, the provisioning of the stations being performed by means of at least one mobile cryogenic tank according to any one of the features hereinabove or hereinbelow, wherein the fluid storage and usage stations each comprise a liquefied gas fluid store configured to store the cryogenic fluid at determined thermodynamic pressure and temperature conditions, the method comprising the step of measuring the temperature and pressure of the cryogenic fluid in the mobile cryogenic tank, a step of reading the determined thermodynamic temperature and pressure conditions in each of the liquefied gas fluid stores of the stations, the method comprising a step of delivering cryogenic fluid to said stations at respective fluid quantities that are dependent on the cryogenic fluid temperature and pressure measured in the mobile cryogenic tank and on the determined thermodynamic temperature and pressure conditions of each of the liquefied gas fluid stores of the stations.

According to other possible distinctive features:

The method comprises a delivery of cryogenic fluid successively to the first station then to a second station, the method comprising, prior to the delivery of cryogenic fluid to the first station, a step of increasing the pressure in the mobile cryogenic tank by a determined addition of energy by withdrawing some of the fluid and heating it before reinjecting it into the mobile cryogenic tank, the method comprising a step of calculating the future pressure and temperature equilibrium conditions in the mobile cryogenic tank after the delivery of cryogenic fluid on the basis of the aforementioned quantity of added energy and of the temperature and pressure of the cryogenic fluid in the mobile cryogenic tank, the method involving interrupting the delivery of cryogenic fluid to the first station when the calculated future pressure and temperature equilibrium conditions in the mobile cryogenic tank are higher than the determined thermodynamic temperature and pressure conditions for the store of the second station, the step of delivering cryogenic fluid to said stations is performed in a chronological order that is determined on the basis of the temperature and pressure of the cryogenic fluid in the mobile cryogenic tank and of the determined thermodynamic temperature and pressure conditions of each of the liquefied gas fluid stores of the stations.

The invention may also relate to any alternative device or method comprising any combination of the features above or below within the scope of the claims.

BRIEF DESCRIPTION OF THE FIGURES

Other features and advantages will become apparent from reading the following description, which is given with reference to the figures, in which:

FIG. 1 shows a schematic, partial side view of a first example of a tank according the invention, FIG. 2 shows a schematic, partial view in cross-section illustrating another example of a tank according the invention, FIG. 3 shows a schematic, partial side view of a second example of a tank according the invention, FIG. 4 shows a schematic, partial view illustrating an example of the provisioning of stations with cryogenic fluid by means of a mobile tank.

The mobile cryogenic tank 1 comprises an inner shell 2 intended to contain the cryogenic fluid. This inner shell 2, which for example has a cylindrical overall shape, delimits the fluid storage volume. For example, the inner shell 2 comprises a cylindrical portion of circular cross section (shell ring made of stainless steel compatible with the stored fluid or any other appropriate material), to the ends of which curved ends are welded.

The tank 1 also comprises an outer shell 3 positioned around the inner shell 2 and delimiting a space between the two shells 2, 3. The outer shell 3 may for example be made of carbon steel, stainless steel or aluminum and may if appropriate be reinforced with hoops welded on the inside and/or on the outside. The retaining system that holds the inner shell 2 in the outer shell 3 may involve a connection at a longitudinal end and/or a set of retaining arms. For example, the inner shell 2 is held and supported in the outer shell 3 by cylindrical components or ties made of stainless steel, fixed at the rear and mobile at the front (the front and rear referring to the longitudinal ends), so as to allow the inner shell 2 to contract freely when cooled.

Conventionally, the space contains a thermal insulant 4: a vacuum and/or an insulating material such as a multilayer insulation (MLI) or any other suitable insulant.

The inter-wall may notably be filled with multilayer insulation and can be placed under vacuum and then sealed by a check valve which seals against a pumping-out orifice. An auxiliary check valve may be provided for measuring the vacuum and possibly allowing further pumping-out. A safety device is preferably provided to prevent any accidental overpressure in the inter-wall space. A stainless steel outlet plate may be provided in the lower part of the rear endcap for the passage of the pipework connecting with the inner shell 2.

The outer shell 3 may have a shape similar to that of the inner shell 2.

The first shell 2 has a cylindrical overall shape which extends along the central longitudinal axis A, for example, the cylindrical portion (preferably a cylinder of revolution) extends about a central axis A of symmetry. When the tank 1 is in the usage configuration, this central longitudinal axis A is horizontal (or substantially horizontal because it may be inclined slightly if need be). What this means to say is that the tank 1 is oblong and of the "horizontal" type (as opposed to fixed vertical tanks).

The outer shell 3 may be mounted on a chassis with independent supports. This chassis may comprise connecting pieces (cradles) and may be connected to running gear provided with braking equipment conforming to the relevant standards in force, with wings and skirts. Other possible supports may accept retractable landing gear and semitrailer fifth wheel equipped with a standardized kingpin.

The tank 1 comprises a set of temperature sensors measuring the temperature of the fluid in the inner shell 2. This set of temperature sensors is situated on the outer face of the inner shell 2 and measures the temperature of the fluid indirectly by measuring the temperature of the exterior face of said shell 2.

The temperature sensors are thus preferably installed between the inner shell (on the outer skin) and the insulation 4.

The set of temperature sensors comprises a lower sensor 5 positioned at the lower end of the inner shell 2, below the central longitudinal axis A. This lower sensor 5 is for example situated on the bottom generatrix of the cylindrical wall. This lower sensor 5 thus measures the temperature at the lowermost point of the inner shell 2 (which in theory is always in the liquid phase).

The set of temperature sensors further comprises a plurality of intermediate sensors 6 distributed over two lateral faces of the inner shell 2 on either side of the central longitudinal axis A. The plurality of intermediate sensors 6 are distributed vertically between the lower end of the shell situated below the central longitudinal axis A and the upper end of the inner shell 2 situated above the central longitudinal axis A.

In addition, the set of temperature sensors preferably also comprises at least an upper sensor 7 positioned at the upper end of the inner shell 2 situated above the central longitudinal axis A. The upper sensor 7 is for example situated on the top generatrix of the cylindrical wall, at the highest point of the inner shell 2.

As a preference, the tank 1 comprises at least one intermediate sensor 6 situated at a vertical position of the inner shell 2 corresponding to a maximum fill level for filling the tank 1 with liquid. For example, this sensor may be situated at the determined level which corresponds to the level at which the filling of said tank 1 is stopped, this corresponding for example to 90 and 98%, and notably to 94% of the water-holding volume of the inner shell 2. This temperature sensor will make it possible, reliably, via a temperature measurement, to detect when the liquid reaches the filling limit. This can be used to interrupt the filling of the tank. If appropriate, this or these sensors may replace the upper sensor(s) 7 described above.

The set of temperature sensors 5, 6, 7 is preferably situated in the central part of the tank 1 between the two longitudinal ends, which is to say for example in the middle of the tank 1 in the longitudinal direction, between the front and rear ends of the tank 1.

As is visible in [FIG. 1], the plurality of intermediate sensors 6 preferably comprises sensors situated respectively on two opposite lateral faces of the inner shell 2, on either side of the central longitudinal axis A, the intermediate sensors 6 being spaced apart from one another vertically between the lower end and the upper end of the inner shell 2. For example, two sets of three to ten intermediate sensors 6 each are situated respectively on two opposite lateral faces of the inner shell 2. In the nonlimiting example of [FIG. 1] there are five intermediate sensors 6 on each lateral face between the lower 5 and upper 7 sensors. Of course, there could be fewer (two, three, four) or more (six, seven, eight, nine, ten . . . ) of them.

The intermediate sensors 6 situated on either side of the longitudinal axis A are for example positioned symmetrically, which is to say positioned at identical heights. Of course, arrangements whereby the two sets of sensors 6 are vertically offset may be anticipated.

For a diameter of inner shell 2 comprised between 500 and 2800 mm, notably 2400 mm, the intermediate sensors 6 are preferably at least five or six in number and are spaced apart from one another by approximately 200 to 600 mm over the circumference, and notably approximately 500 mm. The sensors may be spaced uniformly around the circumference either vertically or uniformly.

For more precise measurement, the number of sensors 6 may be greater and their spacing shorter in order to cover practically the entire height of the inner shell 2.

As is visible in [FIG. 1], the tank 1 preferably comprises an electronic data storage and processing member 8 comprising a microprocessor and/or a computer for example. This electronic member 8 is connected (by a wired or wireless link) to the set of temperature sensors 5, 6, 7 and is configured to receive the temperature values measured by said sensors.

This on-board data acquisition may use a plc (programmable logic controller) and may be either downloaded when the tank returns to a central station and/or be transmitted wirelessly, for example using GSM communications for example.

This electronic member 8 mounted on the tank or remotely (see [FIG. 3] which shows both scenarios) is configured to determine at least one of the following: the temperature of the fluid in the tank, the level of liquid in the tank 1, the volume of liquid in the tank 1. In particular, the plurality of sensors makes it possible to determine the level of liquid more precisely via the temperature measurements, and the stratification of temperature in the inner shell 2.

As a preference, the electrical parts (connecting cables between the sensors and the electronic member 8) are positioned in and extend toward the front part of the tank 1 in the inter-wall space. The outlet for the electrical circuitry toward the member 8 positioned outside the tank is thus situated at the front of the tank, preferably at the opposite end from the fluidic circuitry detailed hereinafter. These electrical lead-throughs situated at the front of the tank allow them to be located away from the potentially explosive atmosphere (flammable gas vapors).

The tank 1 in effect conventionally comprises a set of pipe(s) 10, 11 equipped with valve(s) 12, 13 connected to the inner shell 2 and opening to outside the tank 1 for filling and withdrawing from the inner shell 2. In addition, the tank 1 preferably comprises a pressurizing device that allows liquid to be withdrawn, heated and reinjected into the inner shell 2 with a view to increasing the pressure in the shell 2. Such a pressurizing heater may comprise a bundle of tubes (with or without fins) the purpose of which is to vaporize the liquid with which it is gravity fed. The gas thus produced is returned to the gaseous phase of the inner shell 2, thus providing the pressurization needed for directly transferring liquid or for priming a transfer pump. This fluidic circuitry is preferably positioned at the other, rear, end of the tank 1.

A control cabinet may be provided at the rear of the tank to house and regroup the safety, control and operating accessories needed for exploiting the tank 1, notably taps, valves, pressure gauges, level gauges, liquid flow meter, etc.

The accessories are checked for leaks preferably at low temperature.

A pressure sensor 9 for measuring the pressure in the inner shell 2 may be provided and may if necessary provide its measurement to the electronic member 8.

The embodiment variant in [FIG. 3] differs from that of [FIG. 2] in that the set of temperature sensors comprises several groups of sensors 5, 6, 7 situated at different distinct longitudinal locations in the longitudinal direction A. Thus, in the example of [FIG. 3], there are three groups of sensors distributed longitudinally (rather than one group of sensors according to [FIG. 1]). These three groups of sensors are distributed as follows: one in the middle and two respectively near the two longitudinal ends of the inner shell 2. Of course, configurations with two groups of sensors or four or more may be envisioned.

Such a tank allows better knowledge of the distribution and temperatures of the gaseous and liquid phases. This temperature information thus makes it possible to adapt the journeys and fillings of the stations that are to be provisioned with cryogenic fluid. This makes it possible to limit the amount of boil-off gas and discharges of gas into the atmosphere.

This makes it possible to improve the recovery of the gaseous phase brought about by the increase in pressure when the tank 1 returns to the filling center (the source of liquid such as liquefier). Awareness and control of the temperature of the depressurized gas in the liquefier has a significant impact on the cycle of a re-condensation process. This allows the process of recycling the gaseous phase to be optimized.

The temperature measures make it possible to determine the level of liquid inside the inner shell 2 more precisely, particularly when unloading or parking the tank 1 (notably in case of stratification inside the inner shell 2).

This allows better monitoring of the contents and improves the reliability of the logistic by allowing a check of the calculations of fluid quantities delivered.

In the logistics of multiple fluid deliveries, the measured temperature of the liquid has a significant impact on the management of the pressure of the station to be delivered to. Specifically, stations 110, 120, 113, which are each fluidly connected with a respective liquified gas fluid storage 210, 220, 230, may have relatively hotter or relatively colder fluid requirements (for example liquid hydrogen at −240° C. at 3 bar pressure or −240° C. at a pressure of 9 bar). The measuring of temperature in the mobile tank 1 allows the sequencing of the deliveries to be adapted accordingly (from the coldest to the warmest for example). In the case of stations needing relatively warmer fluid, the relatively colder fluid in the tank 1 can be used if necessary to regulate the pressure in the tank 1. This makes it possible to improve the efficiency of the pumping-out at the station delivered to. The reliability of the logistics is also improved (no need for ventilation because no outgassing for example).

These temperature measurements may make it possible to anticipate the drop in pressure in the inner shell 2 after a braking procedure performed by the driver (intended to lower the pressure by causing the two phases to mix) so as to avoid ventilating the trailer on the site delivered to.

In addition, in the case of successive deliveries, the temperature (and, where applicable, pressure) measurement make it possible to calculate in advance the thermodynamic conditions of equilibria in the inner shell 2 after a delivery, and whether these conditions are compatible with the thermodynamic requirements for the next delivery.

Specifically, when, prior to delivering cryogenic fluid to the first station 110, the risen step of increasing the pressure in the mobile cryogenic tank 1 via a determined addition of energy (by withdrawing some cryogenic fluid which is heated before being reinjected into the tank), the future equilibrium pressure and temperature conditions in the inner shell 2 at the end of the delivery of cryogenic fluid can be calculated on the basis of the initial temperature and pressure conditions and possibly the conditions during the course of heating in the inner shell 2, and of the quantity delivered. If these conditions render the conditions incompatible with a subsequent delivery to another station 120, the first delivery may be interrupted prematurely for example.

These calculations may use equations or models of the first principle of thermodynamics type, applied to the closed volume formed by the tank.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A mobile cryogenic tank for transporting cryogenic fluids, comprising:
   a. an inner shell configured to contain the cryogenic fluid that has a lower end and an upper end, the inner shell having a cylindrical overall shape extending along a central longitudinal axis (A) when the tank is in a transport and usage configuration, the central longitudinal axis (A) being oriented horizontally and being disposed between the lower and upper ends;
   b. an outer shell positioned around the inner shell and delimiting a space between the inner and outer shells, said space containing a thermal insulant;
   c. a set of temperature sensors measuring the temperature of the cryogenic fluid in the inner shell each of which is situated on an outer face of the inner shell and measures a temperature of said shell, the set of temperature sensors comprising:
      i. a lower temperature sensor positioned at a lower end of the inner shell situated below the central longitudinal axis (A); and
      ii. a plurality of intermediate temperature sensors distributed over two lateral faces of the inner shell on either side of the central longitudinal axis (A), the plurality of intermediate sensors also being distributed vertically between the lower and upper ends; and
   d. an electronic data storage and processing member comprising a microprocessor and/or a computer, said electronic data storage and processing member being connected to the set of temperature sensors and being configured to receive temperature values measured by said sensors and determine at least one of the following: a level of cryogenic liquid in the tank and a volume of cryogenic liquid in the tank,
   wherein said electronic data storage and processing member is further configured to:
      deliver cryogenic fluid to a first station and then to a second station;
      prior to delivering cryogenic fluid to the first station, increasing a pressure in the mobile cryogenic tank by a determined addition of energy by withdrawing some of the cryogenic fluid from the mobile cryogenic tank and heating the withdrawn cryogenic fluid before re-injecting the heated withdrawn cryogenic fluid into the mobile cryogenic tank;
      calculate future pressure and temperature equilibrium conditions that would exist in the mobile cryogenic tank after the delivery of cryogenic fluid to the first station on the basis of the aforementioned quantity of added energy and on the basis of the temperature and pressure of the cryogenic fluid in the mobile cryogenic tank, and interrupt delivery of cryogenic fluid to the first station when the calculated future pressure and temperature equilibrium conditions in the mobile cryogenic tank are higher than the determined thermodynamic temperature and pressure conditions for the store of the second station.

2. The tank of claim 1, wherein each of the temperature sensors of the set of temperature sensors is situated in the central part of the tank between the two longitudinal ends.

3. The tank of claim 1, wherein:
 a. the plurality of intermediate sensors comprises first and second sets of 3-10 intermediate sensors each;
 b. the first and second sets of intermediate sensors are situated, respectively, on two opposite lateral faces of the inner shell on either side of the central longitudinal axis (A);
 c. each of the intermediate sensors in the first set of intermediate sensors is spaced apart vertically between the lower and upper end; and
 d. each of the intermediate sensors in the second set of intermediate sensors is spaced apart vertically between the lower and upper end.

4. The tank of claim 3, wherein each of the first and sets of intermediate sensors comprises 4-8 sensors.

5. The tank of claim 1, wherein the set of temperature sensors further comprises an upper sensor positioned at the upper end.

6. The tank of claim 1, wherein the plurality of intermediate sensors comprises first and second groups of intermediate temperature sensors situated at two distinct longitudinal locations along the longitudinal direction (A), each of the first and second groups of intermediate temperature sensors comprising a plurality of intermediate temperature sensors distributed vertically between the lower and upper ends.

7. The tank of claim 1, wherein said electronic data storage and processing member are further configured to determine a temperature of the cryogenic fluid in the tank.

8. The tank of claim 1, further comprising a pressure sensor for measuring a pressure in the inner shell.

9. The tank of claim 1, further comprises a set of pipes equipped with a valve or valves connected to the inner shell and opening to outside the tank for filling and withdrawing from the inner shell.

10. The tank of claim 1, wherein at least one intermediate temperature sensor of the plurality of intermediate temperature sensors is situated at a vertical position of the inner shell that corresponds to a maximum fill level for filling the tank with cryogenic fluid in liquid form and at which the filling of said tank is stopped.

11. The tank of claim 1, wherein the maximum fill level corresponds to 90-98% of the volume of the inner shell.

12. A method for provisioning a plurality of usage stations with cryogenic fluid using the mobile cryogenic tank of claim 1, wherein:
 each of the plurality of usage stations comprises a liquefied gas fluid storage configured to store the cryogenic fluid, in liquid and gaseous phases, at determined thermodynamic pressure and temperature conditions; and
 the mobile cryogenic tank further comprises a pressure sensor for measuring the pressure in the inner shell;
 said method comprising the steps of:
 measuring a temperature and pressure of the cryogenic fluid in the mobile cryogenic tank;
 determining thermodynamic temperature and pressure conditions in each of the liquefied gas fluid stores of the plurality of stations; and
 delivering cryogenic fluid, using the mobile cryogenic tank, to said plurality of stations, respective cryogenic fluid quantities that are dependent on the cryogenic fluid temperature and pressure measured in the mobile cryogenic tank and on the respective determined thermodynamic temperature and pressure conditions of respective ones of said plurality of stations,
 wherein said plurality of stations comprises first and second stations;
 said step of delivering cryogenic fluid comprises delivering cryogenic fluid to the first station and then to the second station; and
 said method further comprises:
 prior to said step of delivering cryogenic fluid to the first station, a step of increasing a pressure in the mobile cryogenic tank by a determined addition of energy by withdrawing some of the cryogenic fluid from the mobile cryogenic tank and heating the withdrawn cryogenic fluid before re-injecting the heated withdrawn cryogenic fluid into the mobile cryogenic tank; and
 calculating future pressure and temperature equilibrium conditions that would exist in the mobile cryogenic tank after the delivery of cryogenic fluid to the first station on the basis of the aforementioned quantity of added energy and on the basis of the temperature and pressure of the cryogenic fluid in the mobile cryogenic tank,
 wherein delivery of cryogenic fluid to the first station is interrupted when the calculated future pressure and temperature equilibrium conditions in the mobile cryogenic tank are higher than the determined thermodynamic temperature and pressure conditions for the store of the second station.

13. The method of claim 12, wherein said step of delivering cryogenic fluid is performed in a chronological order that is determined on the basis of the temperature and pressure of the cryogenic fluid in the mobile cryogenic tank and on the basis of the determined thermodynamic temperature and pressure conditions of each of the respective liquefied gas fluid stores of the plurality of stations.

14. The method of claim 12, wherein the cryogenic fluid is hydrogen or helium.

* * * * *